(12) United States Patent
Chen et al.

(10) Patent No.: US 11,061,441 B2
(45) Date of Patent: Jul. 13, 2021

(54) ELECTROMAGNETICALLY CONTROLLABLE SLOT COVERS

(71) Applicant: HEWLETT-PACKARD DEVELOPMENT COMPANY, L.P., Spring, TX (US)

(72) Inventors: Wei-Chung Chen, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/649,174

(22) PCT Filed: Dec. 15, 2017

(86) PCT No.: PCT/US2017/066553
§ 371 (c)(1),
(2) Date: Mar. 20, 2020

(87) PCT Pub. No.: WO2019/117931
PCT Pub. Date: Jun. 20, 2019

(65) Prior Publication Data
US 2020/0301479 A1   Sep. 24, 2020

(51) Int. Cl.
*G06F 1/16*   (2006.01)
(52) U.S. Cl.
CPC .......... *G06F 1/1679* (2013.01); *G06F 1/1616* (2013.01); *G06F 1/1656* (2013.01)
(58) Field of Classification Search
CPC .... G06F 1/1616; G06F 1/1626; G06F 1/1656; G06F 1/1679; G06F 1/203; G06F 1/206; H01Q 1/243
See application file for complete search history.

(56) References Cited

U.S. PATENT DOCUMENTS

| | | | |
|---|---|---|---|
| 5,552,960 A * | 9/1996 | Nelson | G06F 1/203 165/104.33 |
| 6,188,368 B1 | 2/2001 | Koriyama et al. | |
| 6,812,958 B1 * | 11/2004 | Silvester | G06F 1/1607 348/207.1 |
| 9,155,183 B2 | 10/2015 | Voronin et al. | |
| 9,213,374 B2 * | 12/2015 | Hung | G06F 1/1681 |
| 9,946,305 B2 * | 4/2018 | Fujikawa | G06F 1/1615 |
| 2007/0291451 A1 * | 12/2007 | Takenoshita | G06F 1/203 361/697 |

(Continued)

FOREIGN PATENT DOCUMENTS

| CN | 102582950 A | 7/2012 |
|---|---|---|
| CN | 105099494 A | 11/2015 |

(Continued)

OTHER PUBLICATIONS

Cao, S. et al, "Resistor Loaded EBG Surfaces for Slot Antenna Design", Jul. 2, 2013.

*Primary Examiner* — Abhishek M Rathod
(74) *Attorney, Agent, or Firm* — HPI Patent Department

(57) ABSTRACT

In one example, a housing is described, which may include an outer cover and an electromagnet. The outer cover may include at least one slot and at least one slot cover to cover the at least one slot. The electromagnet may be fixedly disposed in the housing and aligned with the at least one slot cover to electromagnetically control a movement of the at least one slot cover.

10 Claims, 6 Drawing Sheets

(56) References Cited

U.S. PATENT DOCUMENTS

| | | | |
|---|---|---|---|
| 2009/0103261 A1* | 4/2009 | Shih | G06F 1/1616 |
| | | | 361/679.58 |
| 2009/0146537 A1* | 6/2009 | Wang | H04M 1/0237 |
| | | | 312/334.1 |
| 2009/0256031 A1 | 10/2009 | Harita | |
| 2010/0254111 A1* | 10/2010 | Ligtenberg | H01R 13/74 |
| | | | 361/816 |
| 2011/0043913 A1* | 2/2011 | Wang | G02B 13/001 |
| | | | 359/511 |
| 2012/0162040 A1 | 6/2012 | Taura et al. | |
| 2013/0017696 A1* | 1/2013 | Alvarez Rivera | H01R 13/5213 |
| | | | 439/142 |
| 2014/0092535 A1* | 4/2014 | Chou | H02K 33/12 |
| | | | 361/679.01 |
| 2014/0313665 A1* | 10/2014 | Delpier | G06F 1/1654 |
| | | | 361/679.55 |
| 2015/0009399 A1* | 1/2015 | Jonsson | G06F 1/1686 |
| | | | 348/373 |
| 2015/0077926 A1* | 3/2015 | Schneider | H02J 7/0047 |
| | | | 361/679.41 |
| 2015/0277491 A1* | 10/2015 | Browning | G06F 1/1632 |
| | | | 361/679.44 |

FOREIGN PATENT DOCUMENTS

| | | | |
|---|---|---|---|
| JP | 62278575 | A | 12/1987 |
| JP | 9091808 | A | 4/1997 |

* cited by examiner

ELECTROMAGNETICALLY CONTROLLABLE SLOT COVERS

BACKGROUND

Portable electronic devices are becoming increasingly popular. Examples of portable electronic devices may include handheld computers (e.g., notebooks, tablets, and the like), cellular telephones, media players, and hybrid devices which include the functionality of multiple devices of this type. Due in part to their mobile nature, such electronic devices may often be provided with wireless communications capabilities, which may rely on antenna technology to radiate radio frequency (RF) signals for transmission as well as to gather RF broadcast signals for reception. Further, such electronic devices may include numerous electronic components such as processors, memory, graphics products, and other integrated circuits (ICs) that may generate heat.

BRIEF DESCRIPTION OF THE DRAWINGS

Examples are described in the following detailed description and in reference to the drawings, in which.

DETAILED DESCRIPTION

Electronic devices may include a housing. The housing may include a display and a display cover attached to the display. The display cover may include a metal body and a plastic antenna lid attached at the top of the metal body. The plastic antenna lid may be attached by insert molding the plastic antenna lid to the metal body (e.g., die casting metal body), thereby forming a linkage portion between the plastic antenna lid and the metal body. Further, polishing and painting processes may be performed on the display cover after insert molding the plastic antenna lid. The painting process may include powder coating, liquid putty coating, base coating, and top coating. Further, if a shadow or other indication of the linkage portion between the plastic antenna lid and the metal body is visible, then the steps of polishing and the painting process may be repeated. Further, the electronic devices may generate heat during operation, which can affect the operation efficiency.

Examples described herein may enable transmission and/or reception of antenna signals through the slot, thereby resolving antenna radiation shielding issues for electrically conductive substrates, such as aluminum, magnesium, metal alloy, carbon fiber composite, and the like. Examples described herein may eliminate the insert molding of plastic antenna covers/lids to metal substrates for transmission and/or reception of antenna signals. Examples described herein may also enhance heat dissipation from hot spot areas to outside by opening or uncovering a slot through an electromagnetic switch. Thus, examples described herein may extend a lifetime of electronic components such as a display panel, CPU, battery, and the like. The openness of the slot may be controlled and triggered by the design of the electromagnet.

Examples described herein may provide a housing including an outer cover and an electromagnet. The outer cover may include at least one slot and at least one slot cover to cover the at least one slot. For example, the at least one slot can be defined/disposed corresponding to at least one antenna and/or at least one hot spot area (e.g., a central processing unit (CPU) area, a printed circuit board (PCB) area, and the like). The electromagnet may be fixedly disposed in the housing and aligned with the at least one slot cover to electromagnetically control a movement of the at least one slot cover.

Figure 1A:
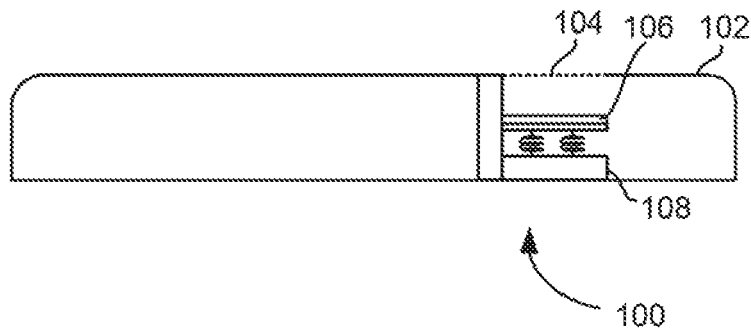
FIG. 1A is a cross-sectional side view of an example housing of an electronic device, depicting an electromagnet that electromagnetically controls a movement of a slot cover to uncover a slot.

FIG. 1A is a cross-sectional side view of an example housing 100 of an electronic device, depicting an electromagnet 108 that electromagnetically controls a movement of a slot cover 106 to uncover a slot 104. Example housing 100 may be a first housing that can be rotatably, detachably, twistably, or externally connected to a second housing of the electronic device. For example, housing 100 may be a display housing or a keyboard housing.

Example housing 100 may include an outer 102. Outer cover 102 may include at least one slot 104 and at least one slot cover 106 to cover at least one slot 104. Example slot 104 may include an opening, window, aperture, and the like in outer cover 102. For example, outer cover 102 may include an elongated slot, multiple elongated slots arranged in a plurality of rows, multiple slots arranged in a plurality of columns, or multiple slots arranged in a plurality of rows and columns. Further, at least one slot cover 108 may be disposed to cover slots 104.

Example housing 100 may include an electromagnet 108 fixedly disposed in housing 100 and in parallel with or otherwise aligned with slot cover 106 to electromagnetically control a movement of slot cover 108. As shown in FIG. 1A, electromagnet 108 may uncover slot 104 upon activation of electromagnet 108.

Figure 1B:
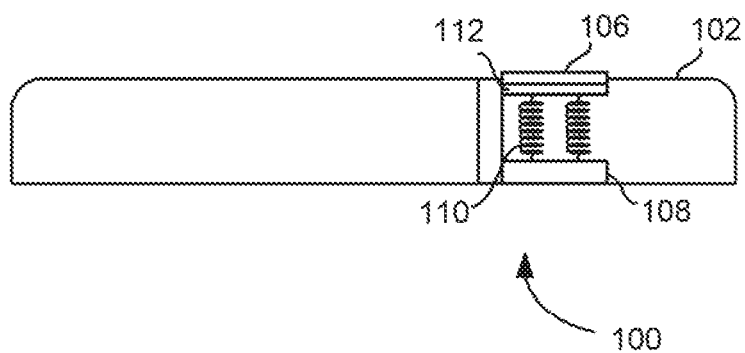
FIG. 1B is a cross-sectional side view of the example housing, depicting the electromagnet that electromagnetically controls the movement of the slot cover to cover the slot.

FIG. 1B is a cross-sectional side view of example housing 100, depicting electromagnet 108 that electromagnetically controls the movement of slot cover 106 to cover slot 104. Housing 100 may include at least one elastic member 110 disposed between slot cover 106 and electromagnet 108. In one example, activation of electromagnet 108 may cause slot cover 106 to move relative to electromagnet 108 via compressing elastic member 110 to uncover slot 104. In another example, deactivation of electromagnet 108 may cause slot cover 106 to cover slot 104 via decompression of elastic member 110.

In one example as shown in FIG. 1B, housing 100 may include at least one magnetic material 112 attached to an interior surface of slot cover 106. Magnetic material 112 may be a material that can be magnetically attracted to electromagnet 108. Example magnetic material 112 may include iron, nickel, cobalt, steel, and the like. During activation of electromagnet 108, magnetic material 112 may interact magnetically with electromagnet 108 to electromagnetically control the movement of slot cover 106. In other examples, slot cover 106 can be made-up of a magnetic material which can interact magnetically with electromagnet 108.

Figure 2:
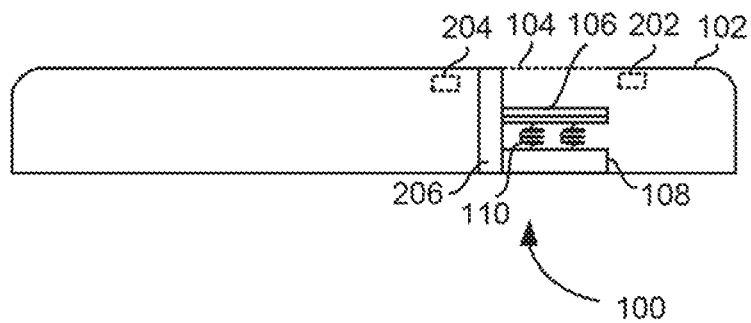
FIG. 2 is a cross-sectional side view of the example housing, depicting additional features.

FIG. 2 is a cross-sectional side view of example housing 100 of FIGS. 1A and 1B, depicting additional features. For example, similarly named elements of FIG. 2 may be similar in structure and/or function to elements described with respect to FIGS. 1A and 1B. As shown in FIG. 2, housing 100 may include at least one antenna 202. For example, antenna 202 may include an antenna with resonating elements that are formed from loop antenna structures, patch antenna structures, inverted-F antenna structures, slot antenna structures, planar inverted-F antenna structures, helical antenna structures, hybrids of these designs, and the like. Different types of antennas may be used for different bands and combinations of bands. For example, one type of antenna may be used in forming a local wireless link antenna and another type of antenna may be used in forming a remote wireless link antenna.

In one example, slot 104 may be disposed around/near antenna 202 to allow transmission and/or reception of antenna signals. In another example, slot 104 may correspond to at least one hot spot area 204 in housing 100 to enhance heat dissipation from hot spot area 204. The term "hot spot area" may refer to a region of housing where heat can be generated by components such as CPU, PCB, display panel, graphics processor, and the like. In one example, a first slot can be disposed near antenna 202 and a second slot can be defined corresponding to hot spot area 204.

In one example, outer cover 102 including slot cover 106 may be made of an electrically conductive substrate such as aluminum magnesium, metal alloy, carbon fiber composite, and the like. In another example, outer cover 102 may be made of a conductive material and slot cover 106 may be made of a non-conductive material such as plastic. In yet another example, outer cover 102 including slot cover 106 may be made of a non-conductive material such as plastic. In this example, openness of slot 104 may dissipate heat from hot spot area 204.

Further, housing 100 may include at least one rail structure 206 to slidably hold slot cover 106. In one example, slot cover 106 may be movable along rail structure 206 to cover or uncover slot 104. During activation of electromagnet 108, slot 104 may be uncovered to allow transmission and/or reception of antenna signals and/or to enhance heat dissipation from hot spot area 204 to outside.

Figure 3A:
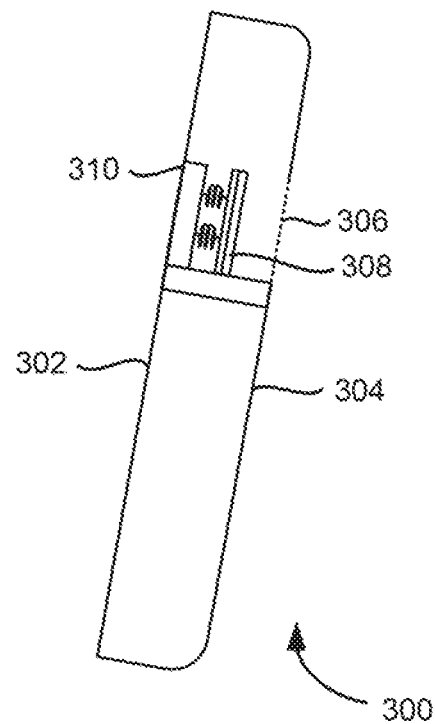
FIG. 3A is a cross-sectional side view of an example electronic device, depicting an electromagnet that electromagnetically controls a movement of a slot cover.

FIG. 3A is a cross-sectional side view of an example electronic device 300, depicting an electromagnet 310 that electromagnetically controls a movement of a slot cover 308. Example electronic device 300 may include a notebook, tablet personal computer (PC), smart phone, television, gaming laptop, workstation, and the like.

Electronic device 300 may include a display 302, a display cover 304 attached to display 302. Example display 302 may include LCD, LED display, electro-luminescent (EL) display, or the like. Electronic device 300 may be equipped with other components such as a camera, audio/video devices, and the like, depending on the functions of electronic device 300.

Display cover 304 may include at least one slot 306 and at least one slot cover 308 to cover at least one slot 306. Further, electronic device 300 may include an electromagnet 310 disposed between display 302 and display cover 304. During operation, electromagnet 310 may electromagnetically control the movement of slot cover 308. As shown in FIG. 3A, electromagnet 310 may control the movement of slot cover 308 to uncover slot 306 upon activation of electromagnet 310.

Figure 3B:
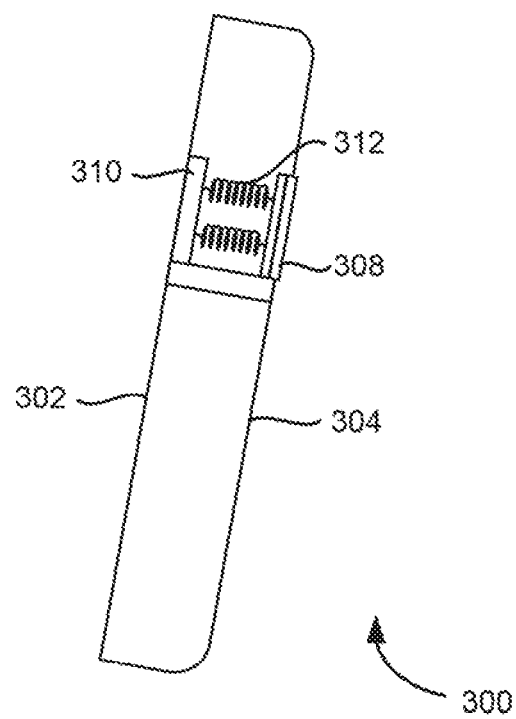
FIG. 3B is a cross-sectional side view of the example electronic device of FIG. 3A, depicting controlling the movement of the slot cover to cover the slot.

FIG. 3B is a cross-sectional side view of example electronic device 300, depicting additional features. As shown in FIG. 3B, electromagnet 310 may control the movement of slot cover 308 to cover slot 306 upon deactivation of electromagnet 310. Electronic device 300 may include at least one elastic member 312 disposed between slot cover 308 and electromagnet 310. In one example, activation of electromagnet 310 may cause slot cover 308 to uncover slot 306 via compression of elastic member(s) 312 (e.g., due to magnetic attraction between electromagnet 310 and slot cover 308). In another example, deactivation of electromagnet 310 may cause slot cover 308 to cover slot 306 via decompression of elastic member(s) 312. Example elastic member 312 may include a spring. In some examples, electronic device 300 may be activated when electronic device 300 is powered-on or when a temperature of electronic device 300 exceeds a threshold value.

Figure 4A:
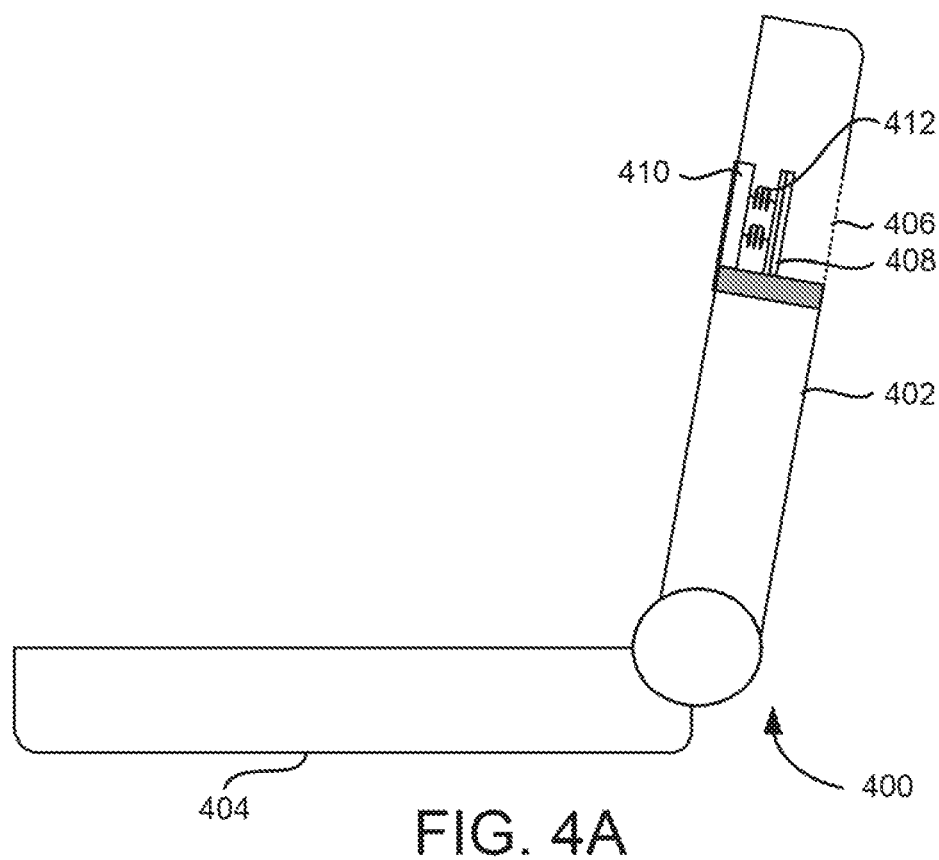
FIG. 4A is a cross-sectional side view of an example electronic device, depicting the electromagnetic control of a movement of a slot cover to uncover a slot.
Figure 4B:
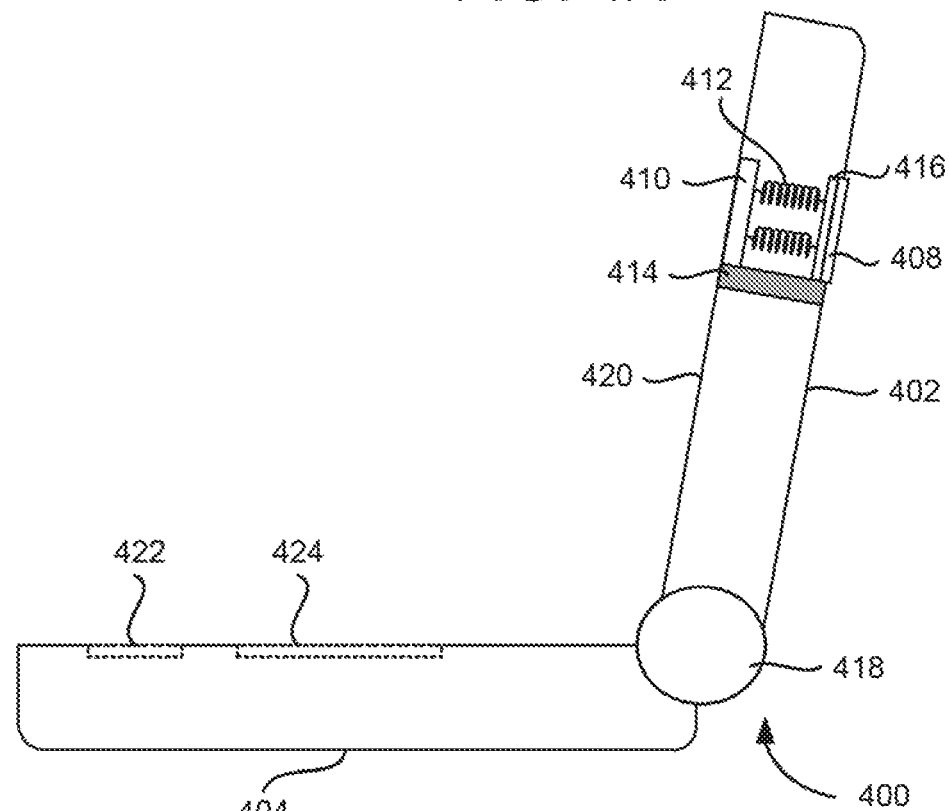
FIG. 4B is a cross-sectional side view of the example electronic device of FIG. 4A, depicting the electromagnetic control of a movement of the slot cover to cover the slot.

FIG. 4A is a cross-sectional side view of an example electronic device 400, depicting electromagnetically controlling a movement of at least one slot cover 408 to uncover at least one slot 406. FIG. 4B is a cross-sectional side view of example electronic device 400 of FIG. 4A, depicting electromagnetically controlling a movement of at least one slot cover 408 to cover at least one slot 406. Example electronic device 400 may be a computing system, for example, a laptop, a convertible device, a personal digital assistant (PDA), a notebook, a sub-notebook, a personal gaming device, or other computing device with a first housing 402 closeable onto a second housing 404. Example convertible device may refer to a device that can be "converted" from a laptop mode to a tablet mode. In the tablet mode, first housing 402 may be closed with a display facing up and viewable, i.e., first housing 402 may be substantially parallel to and adjacent to second housing 404. Electronic device 400 may include a pair of hinge assemblies 418 to pivotally connect first housing 402 and second housing 404. First housing 402 can be rotated between a closed state and an open state. In other examples, first housing 402 can be detachably, twistably, or externally connected to second housing 404.

Electronic device 400 may include first housing 402 (e.g., a display housing) having slot 406. Further, electronic device 400 may include second housing 404 (e.g., a base housing) pivotally coupled to first housing 402, for instance via hinge assembly 418. First housing 402 may house a display 420 and second housing 404 may house a keyboard 424, touchpad 422, battery and the like.

Electronic device 400 may include slot cover 408 disposed in first housing 402 to cover slot 406. For example, slot 406 may have an elongated shape that extends parallel to an axis of rotation. Furthermore, electronic device 400 may include an electromagnet 410 disposed in first housing 402 and in parallel or otherwise aligned with slot cover 408. In addition, electronic device 400 may include at least one elastic member 412 disposed between slot cover 408 and electromagnet 410 such that activation of electromagnet 410 may cause slot cover 408 to uncover slot 406 via compressing elastic member 412.

Further, electronic device 400 may include magnetic material 416 (e.g., steel plate) attached to an interior surface of slot cover 408. In one example, activation of electromagnet 410 may cause magnetic material 416 to interact magnetically with electromagnet 410 such that slot cover 408 uncovers slot 406.

Furthermore, electronic device 400 may include at least one rail structure 414 to slidably hold slot cover 408. In the example shown in FIGS. 4A and 4B, rail structure 414 may be disposed perpendicularly to slot cover 408 and electromagnet 410 and parallel to elastic member 412. During operation, slot cover 408 may be movable along rail structure 414 to cover or uncover slot 406.

Figure 5:
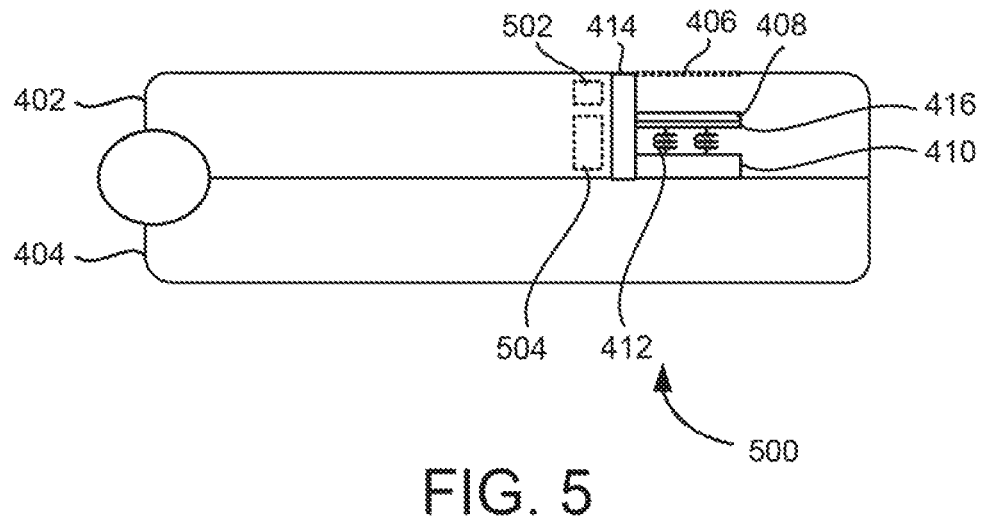
FIG. 5 is a cross-sectional side view of an example electronic device, depicting additional features.

FIG. 5 is a cross-sectional side view of an example electronic device 500 (e.g., such as electronic device 400 of FIGS. 4A and 4B), depicting additional features. For example, similarly named elements of FIG. 5 may be similar in structure and/or function to elements described with respect to FIGS. 4A and 4B. In one example, electromagnet 410 may be activated during powering-on of electronic device 500 to uncover slot 406 to allow transmission and/or reception of antenna signals and/or to dissipate heat from first housing 402.

In other examples, first housing 402 may include at least one sensor 502 to detect a temperature within an interior area of first housing 402. Further, first housing 402 may include a control unit 504 to activate electromagnet 410 which causes slot cover 408 to uncover slot 406 based on the detected temperature.

In one example, control unit 504 may activate electromagnet 410 which causes slot cover 408 to uncover slot 406 when the temperature of first housing 402 exceeds a threshold value. In another example, control unit 504 may deactivate electromagnet 410 which causes slot cover 408 to cover slot 406 when the temperature of first housing 402 falls below the threshold value.

In some examples, electronic device 500 may include at least one antenna disposed in first housing 402. In this example, at least one slot 406 may be disposed near the at least one antenna to allow transmission and/or reception of antenna signals. The antenna may be aligned with slot 406. During antenna operation, wireless antenna signals that have been transmitted by antenna and wireless antenna signals that have been received by antenna may pass through slot 406. In another example, electronic device 500 may include at least one hot spot area. In this example, at least one slot 406 may be defined corresponding to the hot spot area in first housing 402 to dissipate heat from the hot spot area. In this example, slot cover 408 may be electromagnetically controlled to cover/uncover slot 406 during operation of electronic device 500.

Examples described herein can be implemented in first housing 402, second housing 404, or a combination thereof. In one example, slot 406, slot cover 408, and electromagnet 410 may be provided in first housing 402 having a display (e.g., as shown in FIGS. 4A, 4B, and 5). In another example, slot 406, slot cover 408, and electromagnet 410 may be provided in second housing 404 having a keyboard and a keypad (e.g., as shown in FIG. 6).

Figure 6:
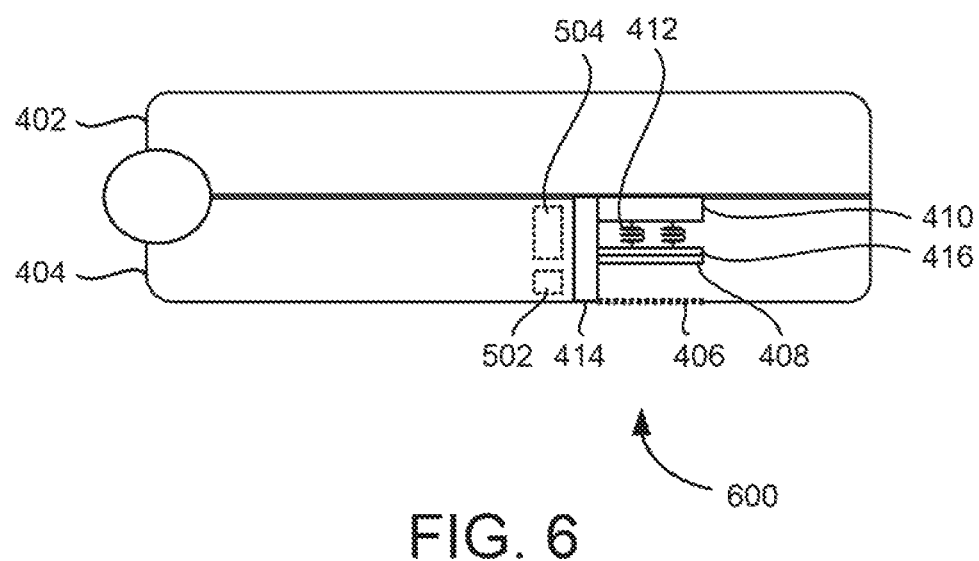
FIG. 6 is a cross-sectional side view of another example electronic device, depicting an electromagnet that electromagnetically controls a movement of a slot cover.

FIG. 6 is a cross-sectional side view of another example electronic device 600 depicting slot 406, slot cover 408, and electromagnet 410 located in second housing 404 that includes a keyboard, a touchpad, a battery, and the like. For example, similarly named elements of FIG. 6 may be similar in structure and/or function to elements described with respect to FIG. 5. In the example shown in FIG. 6, first housing 402 may house a display and second housing 404 may house the keyboard, battery, touchpad, and so on. In this example, slot cover 408 may be electromagnetically controlled to cover/uncover slot 406 during operation of electronic device 600 using electromagnet 410 and elastic member 412 disposed in second housing 404.

Figure 7:
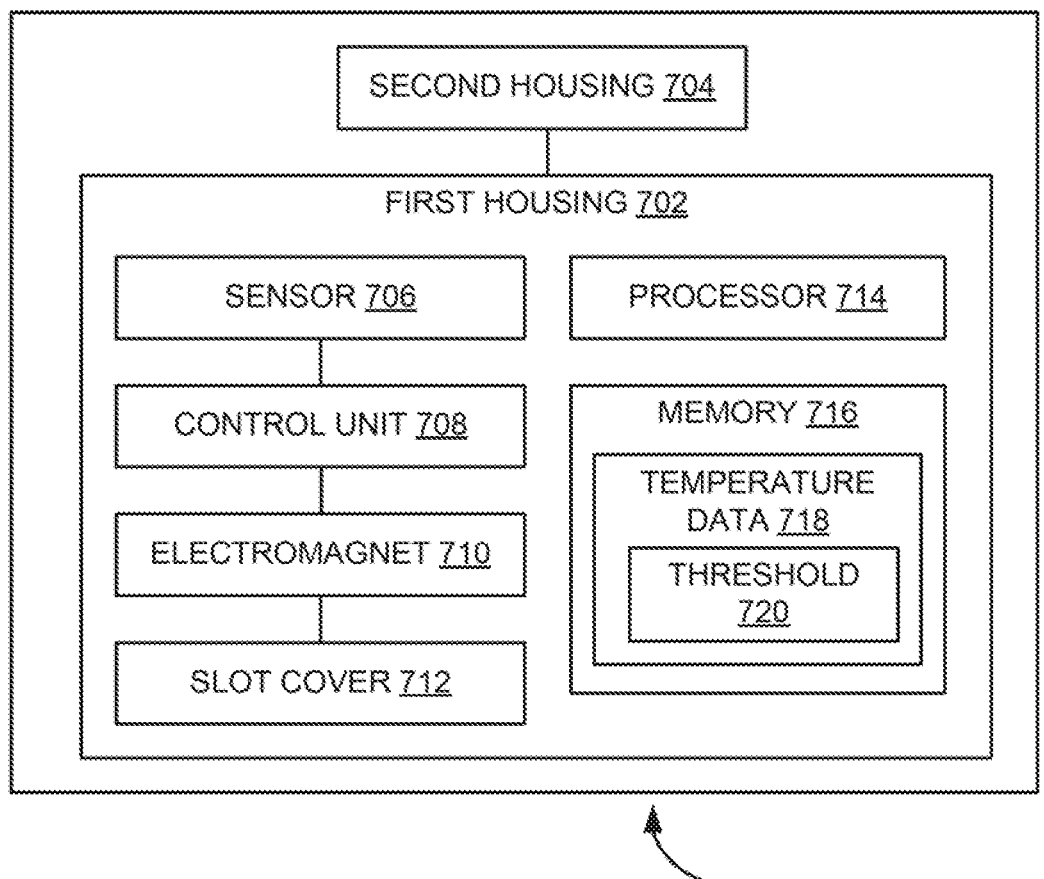
FIG. 7 illustrates a block diagram of an example electronic device.

FIG. 7 illustrates a block diagram of an example electronic device 700. Electronic device 700 may include a first housing 702 and a second housing 704. In the examples illustrated in FIG. 7, first housing 702 may include a sensor 706, a control unit 708, an electromagnet 710, a slot cover 712, a processor 714, and a memory 716. Control unit 708 may include hardware, machine-readable instructions, or a combination of hardware and machine-readable instructions. In some examples, control unit 708 can be stored in memory 716 (e.g., computer-readable storage medium comprising instructions) and executable by processor 714.

In one example operation, electromagnet 710 may be activated when electronic device 700 is powered-on to allow transmission and/or reception of antenna signals of electronic device 700. In another example operation, sensor 706 may be disposed or otherwise located in or near an interior area of first housing 702 to determine or otherwise detect temperature conditions within the interior area of first housing 702. In some examples, the temperature readings or measurements obtained by sensor 706 may be received by control unit 708 and compared to temperature data 718 stored in memory 716.

If a temperature measurement or reading detected by sensor 706 exceeds a temperature threshold 720, control unit 708 may actuate electromagnet 710 which causes slot cover 712 to uncover slot defined in first housing 702. Further, if the temperature reading or measurement detected by temperature sensor 706 falls below temperature threshold 720, control unit 708 may deactivate electromagnet 710 which causes slot cover 712 to cover the slot defined in first housing 702.

In another example, control unit 708 may activate electromagnet 710 in response to temperature variations within the interior area and/or at predetermined time intervals. In other examples, control unit 708 may activate electromagnet 710 when electronic device 700 is powered-on.

Figure 8A:
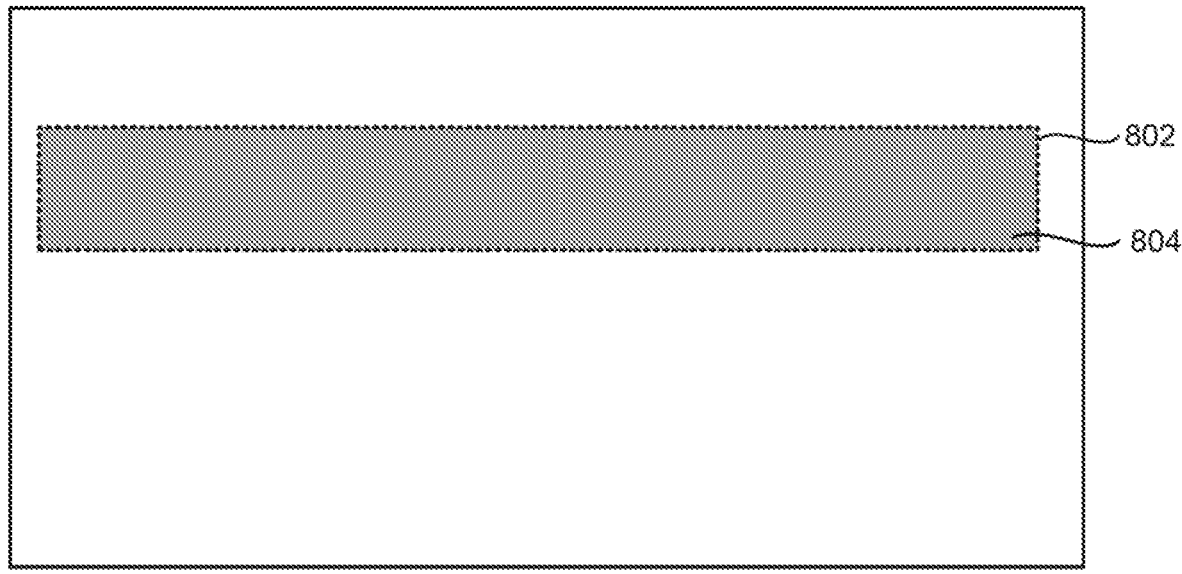
FIGS. 8A-8C illustrate example schematic diagrams of a housing, depicting different slot examples.
Figure 8B:
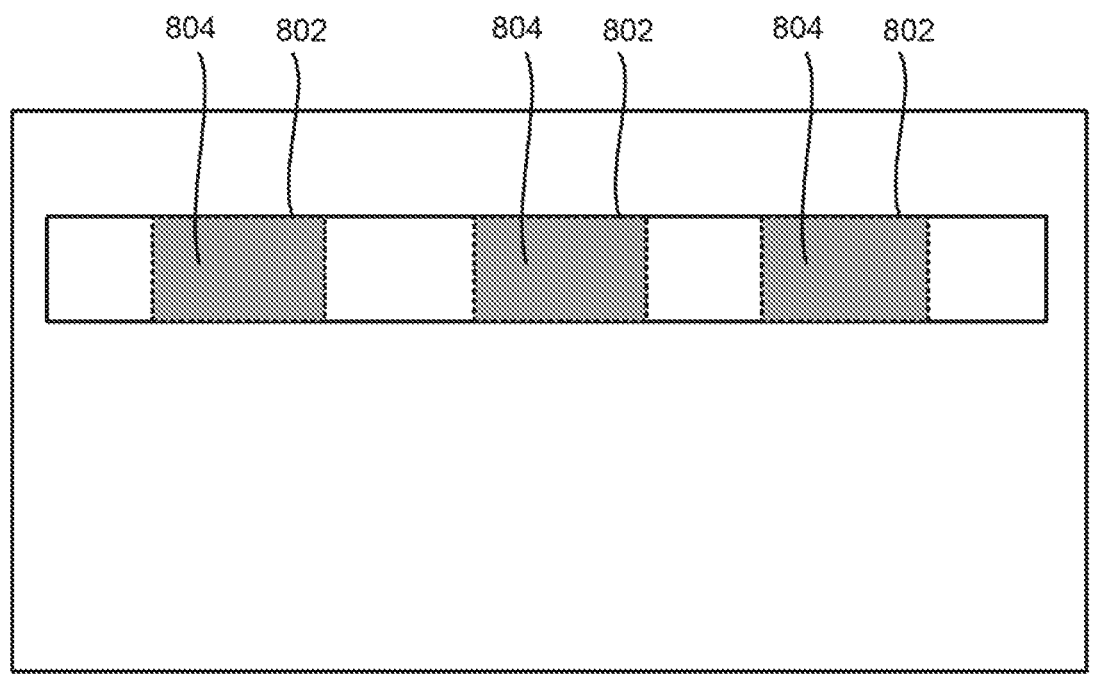
Figure 8C:
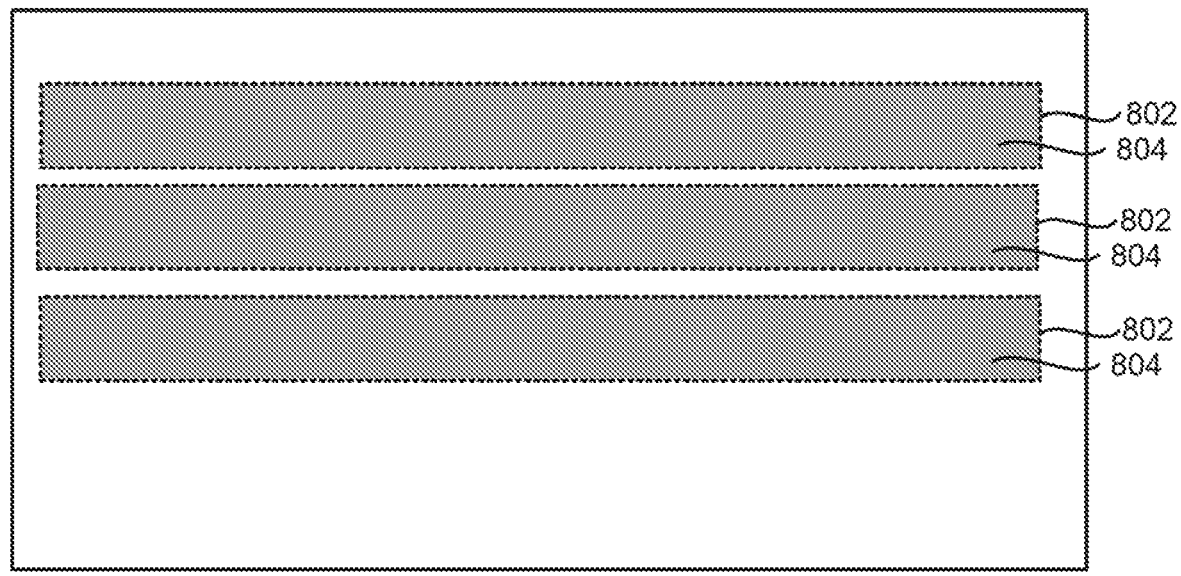

FIGS. 8A-8C are example schematic diagrams of a housing 800, depicting different slot designs. Particularly, FIG. 8A depicts housing 800 including an elongated slot 802 defined corresponding to an antenna area and/or hot spot area. FIG. 8B depicts housing 800 including multiple slots 802 defined in a row corresponding to an antenna area and/or hot spot area. FIG. 8C depicts housing 800 including multiple elongated slots 802 defined in multiple rows corresponding to an antenna areas and/or hot spot areas. Similarly, housing 800 may include any combination of slots that can be arranged in a plurality of rows and/or columns in a display housing and/or base housing. Further, slots 802 may be covered with at least one slot cover 804.

Even though FIGS. 1-8 describe about an electromagnet that is connected to a slot cover via elastic member(s), examples described herein can also be implemented in other ways such that the electromagnet can electromagnetically control a movement of the slot cover during operation of the electronic device.

It may be noted that the above-described examples of the present solution are for the purpose of illustration only. Although the solution has been described in conjunction with a specific implementation thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A housing comprising:
    an outer cover comprising:
        at least one slot; and
        at least one slot cover made of a non-conductive material to cover the at least one slot, the at least one slot cover having a top portion and a bottom portion, the bottom portion including a magnetic material which interacts magnetically with the electromagnet;
    an antenna, wherein the at least one slot is disposed near the antenna to allow transmission and/or reception of antenna signals;
    an electromagnet fixedly disposed in the housing and aligned with the at least one slot cover to electromagnetically control a movement of the at least one slot cover, wherein the electromagnet is magnetically coupled to the at least one slot cover via a magnetic field and modifies the magnetic field to exert a magnetic force on the at least one slot cover to move the at least one slot cover; and
    at least one elastic member disposed between the at least one slot cover and the electromagnet, wherein activation of the electromagnet causes the at least one slot cover to compress the at least one elastic member by moving toward the electromagnet based on the magnetic force exerted on the at least one slot cover.

2. The housing of claim 1, further comprising:
    at least one magnetic material attached to an interior surface of the at least one slot cover, wherein the at least one magnetic material is to interact magnetically with the electromagnet to electromagnetically control the movement of the at least one slot cover.

3. The housing of claim 1, wherein the at least one slot cover has a top portion and a bottom portion, the bottom portion including a magnetic material which interacts magnetically with the electromagnet.

4. An electronic device comprising:
    a display;
    a display cover attached to the display, wherein the display cover comprises:
        at least one slot; and
        at least one slot cover made of a non-conductive material to cover the at least one slot, the at least one slot cover having a top portion and a bottom portion, the bottom portion including a magnetic material which interacts magnetically with the electromagnet;
    an antenna, wherein the at least one slot is disposed near the antenna to allow transmission and/or reception of antenna signals;
    an electromagnet disposed between the display and the display cover, wherein the electromagnet is to electromagnetically control a movement of the at least one slot cover, wherein the electromagnet is magnetically coupled to the at least one slot cover via a magnetic field and modifies the magnetic field to exert a magnetic force on the at least one slot cover to move the at least one slot cover; and
    at least one elastic member disposed between the at least one slot cover and the electromagnet, wherein activation of the electromagnet causes the at least one slot cover to compress the at least one elastic member by moving toward the electromagnet based on the magnetic force exerted on the at least one slot cover.

5. The electronic device of claim 4, wherein the electromagnet is to electromagnetically control the movement of the at least one slot cover to:
    uncover the at least one slot upon activation of the electromagnet; and
    cover the at least one slot upon deactivation of the electromagnet.

6. The electronic device of claim 5, wherein the electromagnet is activated when the electronic device is powered-on or when a temperature of the electronic device exceeds a threshold value.

7. An electronic device comprising:
    a first housing comprising at least one slot;
    a second housing pivotally coupled to the first housing;
        at least one slot cover made of a non-conductive material and disposed in the first housing to cover the at least one slot, the at least one slot cover having a top portion and a bottom portion, the bottom portion including a magnetic material which interacts magnetically with the electromagnet;
    an antenna, wherein the at least one slot is disposed near the antenna to allow transmission and/or reception of antenna signals;
    an electromagnet disposed in the first housing and aligned with the at least one slot cover, wherein the electromagnet is magnetically coupled to the at least one slot cover via a magnetic field and modifies the magnetic field to exert a magnetic force on the at least one slot cover to move the at least one slot cover; and
    at least one elastic member disposed between the at least one slot cover and the electromagnet, wherein activation of the electromagnet causes the at least one slot cover to compress the at least one elastic member by moving toward the electromagnet based on the magnetic force exerted on the at least one slot cover.

8. The electronic device of claim 7, wherein the first housing further comprises:
    at least one rail structure to slidably hold the at least one slot cover, wherein the at least one slot cover is movable along the at least one rail structure to cover or uncover the at least one slot.

9. The electronic device of claim 7, wherein the first housing further comprises:
    at least one sensor to detect a temperature within an interior area of the first housing; and
    a control unit to activate the electromagnet which causes the at least one slot cover to uncover the at least one slot based on the detected temperature.

10. The electronic device of claim 7, wherein the electromagnet is activated during powering-on of the electronic device to uncover the at least one slot to allow transmission and/or reception of antenna signals.

\* \* \* \* \*